July 25, 1933.  M. M. CUNNINGHAM  1,919,187
BRAKE HOOK-UP
Filed Oct. 16, 1930
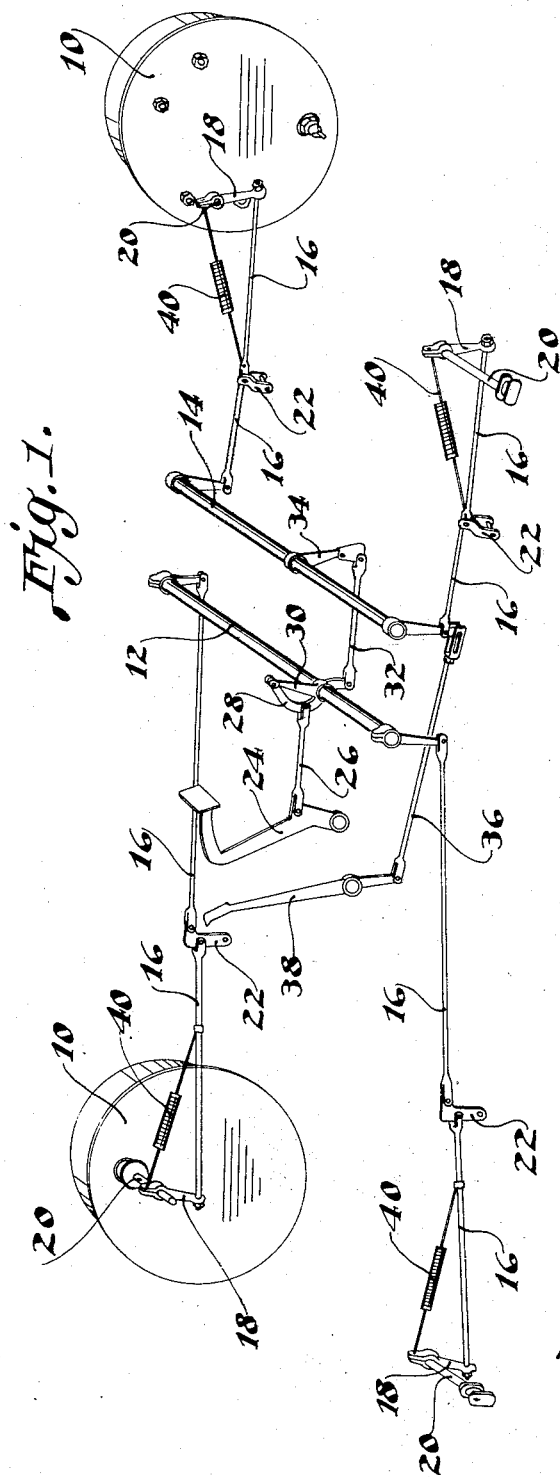
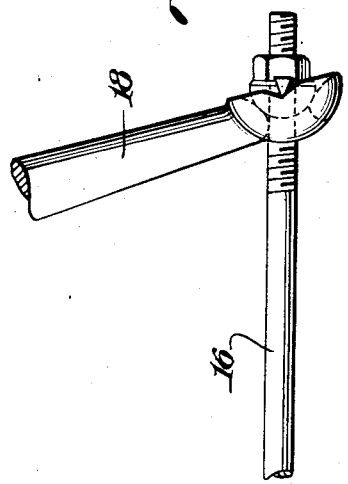
INVENTOR.
MARION M. CUNNINGHAM
BY
M. W. McConkey
ATTORNEY Patented July 25, 1933

1,919,187

UNITED STATES PATENT OFFICE

MARION MORGAN CUNNINGHAM, OF SOUTH BEND, INDIANA, ASSIGNOR TO BENDIX BRAKE COMPANY, OF SOUTH BEND, INDIANA, A CORPORATION OF ILLINOIS

BRAKE HOOK-UP

Application filed October 16, 1930. Serial No. 489,022.

This invention relates to operating mechanism for devices such as brakes and is illustrated as embodied in a novel hookup for a system of four-wheel automobile brakes. An object of the invention is to simplify the mechanism by a novel arrangement of return springs such that they do not need to be attached to any stationary part of the chassis, but can be connected directly between two movable parts of the brake hookup.

Preferably, the return spring is connected between an operating lever and a member which operates the lever in such a manner that it is tensioned when the member is manipulated to operate the lever. In one convenient arrangement, a two-arm lever is used, one arm of which is connected to the brake rod or other operating member and to the other arm of which is connected one end of a return spring, the other end of which is connected to the brake rod or its equivalent so that it is tensioned by movement of the brake rod to operate the lever.

This arrangement is especially advantageous in a construction in which there is an adjustable connection between the lever and the brake rod or its equivalent, as in this case the spring has the additional function of holding the two parts yieldingly together in any position of adjustment. Usually it is necessary to provide special springs for adjustments of this character and by my invention these special springs may be omitted, while their function is retained without the addition of extra parts.

The above and other objects and features of the invention, including various novel and desirable details of construction, will be apparent from the following description of one illustrative embodiment shown in the accompanying drawing, in which:

Figure 1 is a diagrammatic perspective view of one form of four-wheel brake hookup embodying my invention; and Figure 2 is a sectional view on an enlarged scale of a detail of the hook-up disclosed in Figure 1.

The hookup shown in the figures and which is intended for the operation of a system of four-wheel brakes 10 on an automobile chassis (not shown), includes a pair of brake operating shafts 12 and 14 connected by brake rods 16 or equivalent operating members to novel levers 18 mounted on the cam shafts 20 of the brakes. If desired, the usual idler levers 22 may be provided between the sections of the brake rods 16, the idler levers being mounted on the chassis frame in the usual manner adjacent the front ends of the rear springs and adjacent the rear ends of the front springs. Preferably, the connection between the brake rods 16 and the operating levers 18 is an adjustable one, for example the brake rods may pass through openings in the ends of the levers and nuts or like stops be threaded on the ends of the brake rods so that they may be tightened up to take up for wear of the brakes.

In the particular arrangement shown, the brakes are applied for service use by a foot pedal 24 connected by a rod or the like 26 to an equalizer 28, the upper end of which is connected to a lever 30 on the shaft 12 and the lower end of which is connected by means such as a rod 32 to a lever 34 on the shaft 14, the connection to the lever 34 preferably being an overrunning joint. For emergency or parking purposes, the shaft 14 may be operated through an overrunning joint by means such as a brake rod 36 from the usual hand lever 38. This general type of hookup is well known and forms no part of the present invention which is capable of embodiment in brake hookups of different kinds.

According to the illustrated embodiment of the invention, the operating levers 18 are two-arm levers, that is, they have arms or equivalent parts extending on opposite sides of their shafts 20 so that one part may be adjustably connected, as described, to the brakerod 16 while the other part is connected to one end of a return spring 40, the opposite end of which is connected to the brake rod 16. It will be seen that when the brakes are applied the rods 16 and the upper ends of the levers 18 move in opposite directions so that the return springs 40 are tensioned by this movement and consequently operate to return the parts to their initial positions when the brakes are released. Since the position of the rods 16 is fixed by the released position of pedal 24 when the brakes are in their released positions, it will be seen that the springs 40 also have the additional function of holding the lower ends of the operating levers 18 against the adjustable stops or nuts on the ends of the rods 16 so that no additional springs are required to maintain a yielding connection at this point.

While one illustrative embodiment of my invention has been described in detail, it is not my intention to limit the invention to that particular embodiment or otherwise than by the terms of the appended claims.

I claim:

1. A brake operating mechanism comprising a wheel brake, a lever connected to said wheel brake, an operating member adjustably connected to the end of the lever, and a spring tensioned by operation of the lever by said member and yieldingly holding the end of the lever in its adjusted position on said member.

2. A brake mechanism comprising a wheel brake double-ended lever operatively connected to said wheel brake, an operating member adjustably connected to one end of said lever, and a spring tensioned between the other end of said lever and said operating member.

3. A brake hookup comprising a double-ended lever, a rod passing through an opening in one end of said lever and having an adjustable stop on its end arranged to engage and operate said end of the lever, and a spring tensioned between the other end of said lever and said rod and holding the first end of the lever yieldingly against the adjustable stop.

4. A brake mechanism comprising a plurality of wheel brakes, an operating lever connected to each of said wheel brakes, a longitudinally movable member connected to each of said levers for operating its associated lever, a spring connected to each of said levers and to its associated longitudinally movable member and tensioned by the operation of the lever by said member, and means for moving all of said longitudinally movable members.

5. A brake operating mechanism comprising a double ended lever, an operating member connected to one end of the lever and normally forming an angle less than a right angle with said lever, and a spring tensioned between the other end of the lever and said operating member.

6. A brake operating mechanism comprising an operating lever, a longitudinally movable member for operating the lever, a spring connected to the lever and to said longitudinally movable member and tensioned by operation of the lever by said longitudinally movable member, a foot pedal, and means connecting said foot pedal and said longitudinally movable member.

7. A brake hook-up comprising a double ended lever formed with an opening adjacent to one end thereof, an operating member having one end passing through said opening, an adjustable nut secured to said end of the operating member and arranged to engage and operate said lever, and means consisting of a single spring for returning said lever and member to their normally brake inoperative position and for maintaining said nut in contact against said lever.

8. A brake mechanism comprising a wheel brake, an operating lever connected thereto, and an operating member connected to said lever, means for adjusting the connection between said operating lever and said operating member, and means consisting of a single spring for maintaining said adjustable connection in operative relationship and for urging said operating lever and said longitudinally movable member to their normal brake released position.

9. A brake operating mechanism comprising a wheel brake, a shaft connected to said wheel brake, a lever mounted on said shaft and having parts extending on opposite sides of said shaft, a longitudinally moving operating member for said lever connected to one of said parts of said lever, and a spring connected at one end to the other of said parts of the lever and at its opposite end to said member.

MARION MORGAN CUNNINGHAM.